United States Patent
Rossi et al.

(10) Patent No.: US 9,156,354 B2
(45) Date of Patent: Oct. 13, 2015

(54) DRIVER ASSISTANCE SYSTEM HAVING AUTONOMOUS BRAKING TO A STANDSTILL

(71) Applicant: KNORR-BREMSE Systeme fuer Nutzfahrzeuge GmbH, Munich (DE)

(72) Inventors: Mark Rossi, Freiberg a.N. (DE); Thomas Hackl, Asperg (DE); Jochen Banspach, Neckarbischofsheim (DE); Ulrich Guecker, Schwieberdingen (DE); Markus Klein, Pforzheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 14/222,237

(22) Filed: Mar. 21, 2014

(65) Prior Publication Data

US 2014/0207352 A1    Jul. 24, 2014

Related U.S. Application Data

(63) Continuation of application No. PCT/EP2012/068497, filed on Sep. 20, 2012.

(30) Foreign Application Priority Data

Sep. 22, 2011   (DE) .......................... 10 2011 114 072

(51) Int. Cl.
*G06F 19/00*   (2011.01)
*B60K 31/00*   (2006.01)
(Continued)

(52) U.S. Cl.
CPC ............. *B60K 31/0008* (2013.01); *B60K 28/14* (2013.01); *B60T 7/22* (2013.01); *B60T 2201/024* (2013.01); *B60W 2420/52* (2013.01); *B60W 2720/10* (2013.01)

(58) Field of Classification Search
CPC .. B60K 31/00; B60R 2325/205; B60R 25/02; B60R 25/042; B60R 25/08
USPC ................ 701/1, 36, 70; 156/308.4, 325, 499
See application file for complete search history.

(56) References Cited

U.S. PATENT DOCUMENTS

| 5,977,869 A | 11/1999 | Andreas |
| 6,259,992 B1 | 7/2001 | Urai et al. |

(Continued)

FOREIGN PATENT DOCUMENTS

| DE | 199 25 643 A1 | 12/1999 |
| DE | 196 50 168 C2 | 10/2001 |

(Continued)

OTHER PUBLICATIONS

International Preliminary Report on Patentability (PCT/IB/326) and (PCT/IB/373) dated Apr. 3, 2014, including Written Opinion (PCT/ISA/237) (seven (7) pages).

(Continued)

*Primary Examiner* — McDieunel Marc
(74) *Attorney, Agent, or Firm* — Crowell & Moring LLP

(57) ABSTRACT

A driver assistance system for a vehicle is provided. The driver assistance system includes a detecting device, which is designed to detect driving data that characterize the driving state of the vehicle, and a controller, which is designed to process the driving data detected by the detecting device and, if predetermined driving data are present, trigger a braking device to perform autonomous braking of the vehicle. The controller is also designed such that if driving data that indicate an imminent collision with an obstacle are detected, the function of the detecting device is monitored. If the detecting device no longer provides any driving data or plausible driving data to the controller, a continuation of the autonomous braking is triggered, at least until the vehicle has been decelerated to a specified speed.

15 Claims, 1 Drawing Sheet

(51) Int. Cl.
*B60T 7/22* (2006.01)
*B60K 28/14* (2006.01)

(56) References Cited

U.S. PATENT DOCUMENTS

| | | | |
|---|---|---|---|
| 6,647,328 B2* | 11/2003 | Walker | 701/36 |
| 7,259,357 B2* | 8/2007 | Walker | 219/243 |
| 7,715,969 B2 | 5/2010 | Yamamura | |
| 7,975,798 B2 | 7/2011 | Lucas et al. | |
| 8,146,703 B2 | 4/2012 | Baumann et al. | |
| 8,386,119 B2* | 2/2013 | Kobayashi et al. | 701/29.2 |
| 8,670,915 B2* | 3/2014 | Kuge et al. | 701/96 |
| 8,694,222 B2* | 4/2014 | Zagorski | 701/70 |
| 2001/0027893 A1* | 10/2001 | Nishizaki et al. | 180/409 |
| 2004/0049324 A1* | 3/2004 | Walker | 701/1 |
| 2006/0225971 A1 | 10/2006 | Jaeger | |
| 2007/0276577 A1* | 11/2007 | Kuge et al. | 701/96 |
| 2008/0091309 A1* | 4/2008 | Walker | 701/1 |
| 2009/0177347 A1 | 7/2009 | Breuer et al. | |
| 2010/0023226 A1 | 1/2010 | Ito | |
| 2010/0222960 A1* | 9/2010 | Oida et al. | 701/29 |
| 2010/0318256 A1 | 12/2010 | Breuer et al. | |
| 2011/0004387 A1* | 1/2011 | Sugano et al. | 701/96 |
| 2013/0238211 A1* | 9/2013 | Kuge et al. | 701/96 |

FOREIGN PATENT DOCUMENTS

| | | |
|---|---|---|
| DE | 10 2004 055 399 A1 | 5/2006 |
| DE | 10 2004 057 604 A1 | 6/2006 |
| DE | 10 2004 058 663 A1 | 6/2006 |
| DE | 10 2005 016 001 A1 | 10/2006 |
| DE | 10 2007 050 221 A1 | 4/2009 |
| DE | 10 2009 002375 * 4/2009 | B60R 21/01 |
| DE | 10 2007 052 439 A1 | 5/2009 |
| DE | 10 2009 033 891 A1 | 2/2010 |
| DE | 10 2009 002 375 A1 | 10/2010 |
| DE | 10 2011 114 072 B4 | 8/2013 |
| EP | 2 077 212 A1 * 10/2008 | B60K 31/00 |
| EP | 1 574 384 B1 | 11/2008 |
| EP | 2 055 541 B1 | 5/2009 |
| EP | 2 077 212 A1 | 7/2009 |
| EP | 2 214 940 B1 | 2/2011 |
| WO | WO 2013/041600 A1 | 3/2013 |

OTHER PUBLICATIONS

Corresponding International Search Report with English Translation dated Dec. 21, 2012 (six (6) pages).
German examination report dated Sep. 7, 2012 (four (4) pages).
Opposition Letter to German Patent and Trademark Office communicated Oct. 31, 2013 (twenty four (24) pages).
Communication from German Patent and Trademark Office dated Nov. 7, 2013 (one (1) page).
Communication from German Patent and Trademark Office dated Jan. 13, 2014 (one (1) page).
Robert Bosch GmbH, "Autoelektrik Autoelektronik", (2002) (sixteen (16) pages).
Dr. —Ing. Ralf Leiter et al., "Bremsanlagen", vogel Vuchverlag, (2004) (eleven (11) pages).
"Vehicle Regulations" Fahrzeug Vorschriften, Aug. 2004, Wabco, Vehicle Control Systems, (four (4) pages).

* cited by examiner

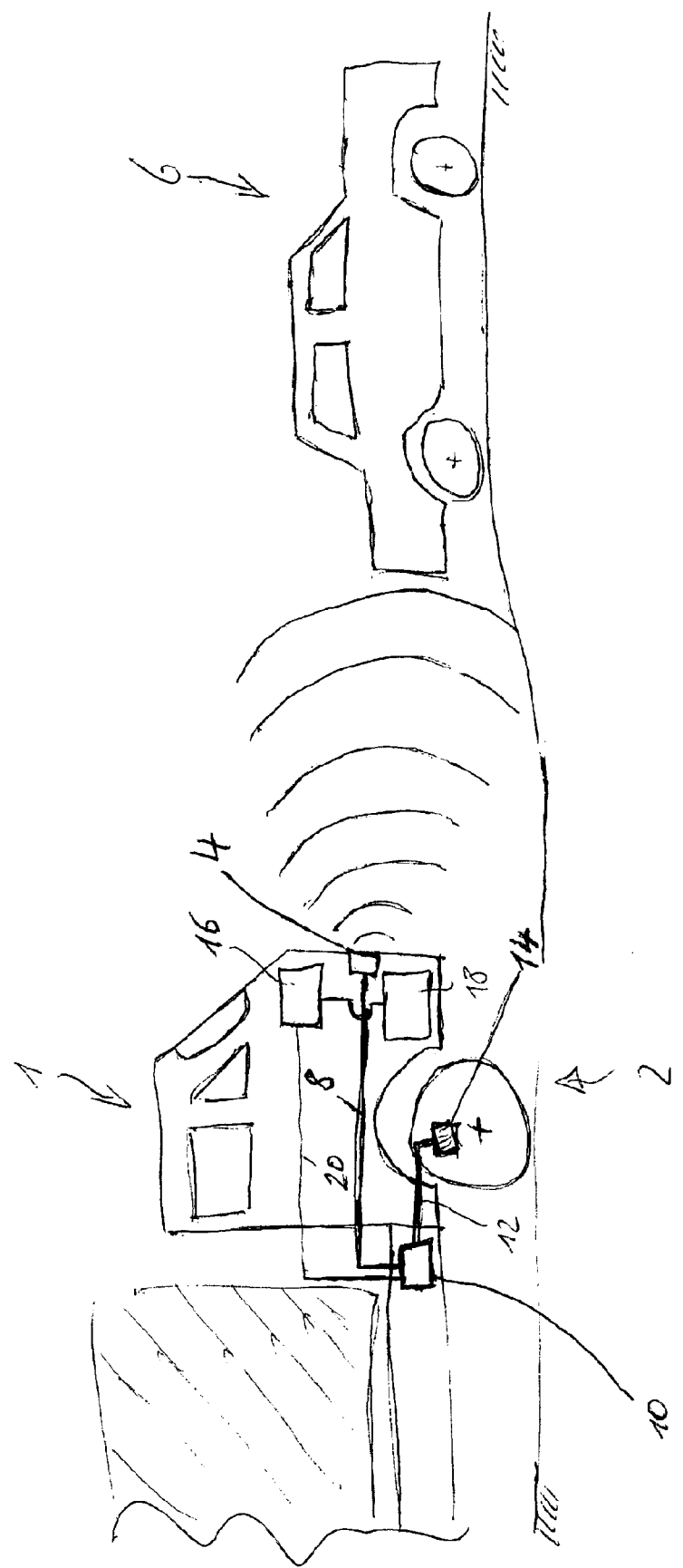

DRIVER ASSISTANCE SYSTEM HAVING AUTONOMOUS BRAKING TO A STANDSTILL

CROSS-REFERENCE TO RELATED APPLICATIONS

This application is a continuation of PCT International Application No. PCT/EP2012/068497, filed Sep. 20, 2012, which claims priority under 35 U.S.C. §119 from German Patent Application No. 10 2011 114 072.0, filed Sep. 22, 2011, the entire disclosures of which are herein expressly incorporated by reference.

BACKGROUND AND SUMMARY OF THE INVENTION

The invention relates to a driver assistance system for a vehicle, including a detection device which is configured to detect driving data which characterizes the driving state of the vehicle and a controller which is designed to process the driving data detected by the detection device and, if predetermined driving data is present, to cause a brake device to carry out autonomous braking of the vehicle, and to a method for braking a vehicle including detecting driving data characterizing the driving state of the vehicle, by a detection device and processing the detected driving data and, if predetermined driving data is present, carrying out autonomous braking of the vehicle by the brake device.

A related art driver assistance system or method for braking a vehicle is known from EP 2 214 940 B1. In the related art driver assistance system, autonomous emergency braking of a vehicle with maximum available braking force is triggered by the service brake, independently of the driver, if the circumstances require it. If the vehicle has then come to a stationary state owing to the emergency braking, a device for detecting the vehicle in front checks whether a vehicle is located in front of the vehicle which has braked to a stationary state. If this is the case, a parking brake of the vehicle is applied. This is intended to prevent the vehicle which has been braked by emergency braking from being pushed into the vehicle in front by a vehicle driving behind. However, this assumes that the device for detecting the vehicle in front has not been damaged in an impact with the vehicle in front which, however, cannot be ruled out in the event of a collision occurring with the vehicle in front, despite the emergency braking which has been initiated.

Furthermore, driver assistance systems such as an ACC (Adaptive Cruise Control) system are also known from the related art. These systems measure the distance from a vehicle driving in front using a corresponding detection device and signal said distance to a controller, which then adjusts the actual distance from the vehicle driving in front to a speed-dependent setpoint distance by intervening in an engine controller and/or in a brake device. However, in the known ACC systems, this adjustment is only effective for as long as the detection device, for example a distance sensor, functions. In the cases in which the difference in speed from the vehicle driving in front has, however, become so large or the distance from the latter is so short that there is a high probability that an impact has to be expected, damage to the distance sensor must be expected because said sensor is generally arranged right at the front on the vehicle. However, owing to the detection device which is then defective, no intervention of the brake device takes place anymore, with the result that the movement energy of the affected vehicle is then dissipated only by the deformation work which is based on the collision with the vehicle driving in front.

In contrast to the above, the invention is based on the object of developing a driver assistance system or a method for operating a brake device of the type mentioned at the beginning in such a way that the consequences of an accident when there is a collision with an obstacle are alleviated.

In autonomously intervening ACC systems according to the related art, the detection device in the form of a distance sensor is generally destroyed when there is a collision with an obstacle, for example with a vehicle driving ahead. For this reason, the distance control system and therefore autonomous braking which is already initiated by the control device of the ACC system are aborted.

According to an aspect of the invention, a driver assistance system includes a detection device which is configured to detect driving data which characterizes the driving state of the vehicle, as well as a controller which is designed to process the driving data detected by the detection device, and, if predetermined driving data is present, to cause a brake device to carry out autonomous braking of the vehicle. However, in contrast to the related art, the controller is also designed such that when driving data which indicates a directly imminent collision with an obstacle is detected, the controller monitors the function of the detection device, and if the detection device no longer supplies any driving data or any plausible driving data to the controller, brings about continuation of the autonomous braking at least until the vehicle has been decelerated to a predefined speed.

According to another aspect of the invention, a method for braking a vehicle includes detecting, by a detection device, driving data characterizing the driving state of the vehicle, processing the detected driving data and, if predetermined driving data is present, carrying out autonomous braking of the vehicle by the brake device. If driving data which indicates an immediately imminent collision with an obstacle is detected by the detection device, the function of the detection device is monitored, and if the detection device no longer supplies any driving data or any plausible driving data the autonomous braking is continued at least until the vehicle has been decelerated to a predefined speed.

An "obstacle" is understood to mean here any obstacle which is suitable for colliding with a vehicle owing to a movement of said vehicle. For example, an "obstacle" is to be understood as meaning a vehicle which is driving in front or a stationary vehicle which is located in the movement path of the vehicle.

"Autonomous braking" is to be understood as meaning braking which is not initiated by the driver but rather by the driver assistance system. Furthermore, the predefined (lower) speed, to which the vehicle is decelerated by the brake device which is still kept applied even after a collision with the obstacle, is preferably the stationary state of the vehicle, that is to say a speed which is equal to zero. However, since speed sensors have been found empirically to be incapable of detecting precisely speeds below approximately 3 km/h to 5 km/h or of differentiating such a low speed from a stationary state, the predefined speed can also be this empirical value of the detection limit from 3 km/h to 5 km/h. The predefined speed up to which the vehicle is to be decelerated by the still applied brake device even after a collision with the obstacle can be any speed which is less than the speed of the vehicle which is present immediately before the collision with the obstacle. Even then, a deceleration which acts beyond the time of the collision and which goes beyond the intervention by the brake device is still present. The value of this predefined speed is defined by a person skilled in the art on the basis of empirical values.

The plausibility of the driving data supplied by the detection device, such as for example the actual distance from the vehicle in front, can be checked, for example, by comparison with the data supplied by further sensors, such as wheel rotational speed sensors, acceleration sensors, etc. Last but not least, redundant distance sensors whose measured values are compared with one another are also conceivable.

If the detection device can no longer supply any driving data or any plausible driving data at all, integrated algorithms of the driver assistance system determine a collision with the obstacle or with the vehicle driving in front. In this context, assumptions based, in particular, on statistical experiences can be made. In this case, the autonomous braking which is initiated by the driver assistance system, for example on the basis of an excessively short distance and/or on the basis of an excessively high speed relative to the obstacle even before the collision, is also continued after the collision until the vehicle has been decelerated to the predefined speed or to a stationary state.

However, if the detection device has not suffered any damage as a result of the collision and continues to supply plausible driving data, representing reality, to the controller, the driver assistance system can maintain, uninterruptedly per se on the basis of the distance from the vehicle in front or from the obstacle which has then shrunk, for example, to a very small value or to zero, the autonomous braking on the basis of the control algorithms, without a further intervention having to take place. This is because in this case the objective of autonomous or automatic braking which is carried out uninterruptedly at least until the predefined speed is reached or until the stationary state is reached is also achieved.

The advantage of these measures is that in the event of damage to the detection device by a collision which results in the detection device then no longer being able to supply any plausible driving data or any driving data at all to the controller, autonomous braking, which has already been previously initiated by the driver assistance system, is continued uninterruptedly until the vehicle has reached the predefined speed or the stationary state. As a result, the brake device can still contribute to dissipating kinetic energy even after a collision with an obstacle, such as a vehicle driving in front or a stationary vehicle, has already taken place, which kinetic energy would otherwise only be dissipated through elastic and plastic deformation of the crush zones of the parties of the collision. The brake device can therefore contribute to decelerating the vehicle driving up from behind, even after a rear end collision with a vehicle driving in front. This is important in particular in the case of a rear end collision at the end of a traffic jam, because the kinetic energy of the vehicle which is driving up from behind at the end should be dissipated as quickly as possible in order to avoid vehicles being pushed onto or into one another by the impact. Overall, embodiments of the invention therefore contribute to alleviating the consequences of accidents in the case of such collisions.

The controller is particularly preferably also designed in such a way that even after the autonomous decelerating of the vehicle to the predefined speed or to the stationary state, it keeps the brake device applied and/or applies a further brake device in order to keep the vehicle in the braked state. The advantage of keeping in a braked state the vehicle which is already in the stationary state after the collision with, for example, a vehicle in front is that the vehicle which is kept in a braked state then provides greater resistance with respect to vehicles which subsequently drive up from the rear, and therefore with respect to the tendency that the vehicle is pushed onto the vehicle in front by the impact.

According to one variant of this measure, the brake device which brakes the vehicle autonomously to the stationary state is a service brake device of the vehicle. The further brake device which then keeps the vehicle in the stationary state can be a parking brake device of the vehicle. In this case, the securing braking force is therefore transmitted from the service brake device to the parking brake device. This variant can be carried out easily particularly if the parking brake device can be controlled or activated by electrical signals which are then modulated, for example, by the controller of the driver assistance system.

According to a further variant, the vehicle can both be braked autonomously to the stationary state by the service brake device and subsequently kept in the braked state by the service brake device. This variant is suitable, in particular, for vehicles in which the parking brake device can only be activated mechanically.

The controller is also particularly preferably designed in such a way that it changes the brake device from the applied state to the released state if a (bifunctional) activation element such as, for example, an accelerator pedal or a clutch pedal of the vehicle has been activated. This applies both to the phase in which the deceleration of the vehicle which has been initiated by the driver assistance system still persists and to the phase in which the vehicle has already been braked to the predefined speed or to the stationary state and secured there. In both phases, the driver is to be provided with the possibility of aborting the autonomous braking at his own volition. This can be advantageous, for example, when after a collision it appears necessary to move the vehicle out of a danger zone if the drive system is still functionally capable, in order, for example, to avoid vehicles driving into the stationary vehicle from the rear by moving the vehicle onto a hard shoulder. However, the activation element can also be a monofunctional activation element, such as a pushbutton key, which is then provided exclusively for the purpose of aborting the autonomous braking.

In addition to the described intervention into the brake device, customary driving assistance systems such as ACC additionally also have the possibility of intervening in the controller of the drive machine. According to one preferred development, the controller of the driver assistance system can therefore be designed in such a way that, in addition to the intervention in the brake device of the vehicle, if predetermined driving data is present, a controller of a drive machine is made to reduce the driving power autonomously. If driving data which indicates an immediately imminent collision with an obstacle is detected, the function of the detection device is then monitored as described, and if the detection device no longer supplies any driving data or any plausible driving data to the controller, in addition to the continuation of the autonomous braking a continuation of the autonomous reduction of the driving power of the drive machine is also brought about, at least until the vehicle has been decelerated to the predefined speed. In this case, the drive machine also contributes with its drag torque to decelerating the vehicle after a collision has taken place.

The power of the drive machine is preferably reduced, for example, as far as an idling rotational speed driving power, but the drive machine is not completely switched off so that the brake device releases the vehicle, as described above, as a result of activation of the accelerator pedal and the vehicle can be set in motion again under its own force in so far as or for as long as this is still possible after the collision.

Other objects, advantages and novel features of the present invention will become apparent from the following detailed description of one or more exemplary embodiments when considered in conjunction with the accompanying drawings.

BRIEF DESCRIPTION OF THE DRAWING

FIG. 1 shows a schematic design of a preferred embodiment of a driver assistance system interacting with a brake device of a utility vehicle.

DETAILED DESCRIPTION OF EXEMPLARY EMBODIMENTS

The driver assistance system 2 which is shown schematically in FIG. 1 and preferably used in a utility vehicle 1 is, for example, an ACC (Adaptive Cruise Control) system which uses a detection device 4 such as a distance sensor to continuously measure driving data, such as the distance from a vehicle 6 driving in front or from a vehicle 6 which is stationary in the sensor detection range, and signals via a data line 8 to a control device, here for example to a brake control device 10 of a brake device of the vehicle. The ACC system 2 then adjusts the actual distance from the vehicle 6 driving in front to, for example, a speed-dependent, setpoint distance by intervening in an engine controller and/or in the brake device. Such application of the brake device, initiated by the driver assistance system 2, then constitutes an autonomous braking.

The brake device is preferably a known electro-pneumatic service brake device in which a brake actuator 14 is preferably controlled electrically by electrical signals of the brake control device 10 via a data line, preferably via a brake CAN 12. The service brake device can, however, also be activated electro-hydraulically, electrically, or pneumatically.

In the present case, the routines of the ACC system 2 are preferably integrated into the brake control device 10 of the service brake device of the utility vehicle 1. Alternatively, it would, of course, also be possible to provide a separate control device for the ACC system 2 which then communicates with the brake control device 10 of the service brake device. For example, radar sensors, video sensors, ultrasonic sensors, or a combination thereof (sensor cluster) can be used as distance sensors 4. Furthermore, the detection device 4 can also include acceleration sensors, wheel rotational speed sensors, yaw rate sensors, and/or steering angle sensors in order to detect further driving data representing the moving state or driving state of the utility vehicle 1.

Algorithms with which it is possible to estimate whether a collision with the vehicle 6 driving in front is probable on the basis of the driving data supplied by the detection device 4 are implemented in the brake control device 10 or in a separate control device of the driver assistance system 2. The driving data detected by the detection device 4 is therefore processed in the brake control device 10, wherein when driving data such as, for example, the instantaneous speed and/or the deceleration of the utility vehicle 1, is detected and the distance of said utility vehicle 1 from the vehicle 6 driving in front, which driving data indicates a directly imminent collision of the utility vehicle 1 with the vehicle 6 driving in front, the further correct functional capability of the detection device 4 is monitored by algorithms implemented in the brake control device 10 to determine whether the driving data supplied by the detection device 4 is plausible or whether driving data can still be supplied at all by said detection device 4.

The plausibility of the driving data supplied by the detection device 4 such as, for example, the current actual distance of the utility vehicle 1 from the vehicle 6 driving in front can be checked, for example, by comparison with the data supplied by various sensors of the detection device 4, such as wheel rotational speed sensors, acceleration sensors etc.

If the detection device 4 can no longer supply any driving data or any plausible driving data, the algorithms of the driver assistance system 2 which are integrated into the brake control device 10 here determine that a collision of the utility vehicle with the vehicle 6 driving in front has occurred or there has been a rear end collision of the utility vehicle 1 with this vehicle 6.

In this case, autonomous braking which is already initiated by the driver assistance system 2, for example initially merely owing to the setpoint distance from the vehicle 6 driving in front being undershot, is continued uninterruptedly chronologically beyond the collision or the rear end collision until the decelerated utility vehicle 1 has reached a predefined speed, which is preferably given by the stationary state of the utility vehicle 1 (speed equal to zero).

The fact that the stationary state of the utility vehicle 1 is reached can be detected, for example, on the basis of sensor data of wheel rotational speed sensors which are present in any case within the scope of vehicle movement dynamics control systems such as ESP or ABS. As a rule, the stationary state of the utility vehicle 1 with a speed equal to zero therefore constitutes the predefined speed to which the utility vehicle 1 is to be decelerated by the automatically applied service brake device even after the collision.

The plausibility of the driving data supplied by the detection device 4, such as the actual distance from the vehicle 6 driving in front can be checked, for example, by comparison with the data supplied by further sensors such as wheel rotational speed sensors, acceleration sensors, etc. Last but not least, redundant distance sensors whose measured values are compared with one another are also conceivable.

If the detection device 4 of the utility vehicle has, on the other hand, not suffered any damage due to the collision or the rear end collision and continues to supply driving data which is plausible, and represents reality, to the brake control device 10, the driver assistance system 2 can maintain the autonomous braking uninterruptedly on the basis of the control algorithms on account of the distance from the vehicle 6 driving in front, which has then shrunk to a very small value or to zero, for example.

The brake control device 10 or the algorithms of the ACC system 2 which are implemented therein are particularly preferably also designed in such a way that even after the autonomous braking of the vehicle to the stationary state by the service brake device, the service brake device is still kept applied. The utility vehicle 1 is therefore both braked autonomously by the service brake device to the stationary state and subsequently kept in the braked state by said service brake device. Alternatively, the brake device which keeps the utility vehicle in the stationary state can be a parking brake device of the utility vehicle. In this case, the securing braking force is transmitted from the service brake device to the parking brake device.

The brake control device 10 or the algorithms of the ACC system 2 implemented therein are particularly preferably also designed in such a way that the service brake device and/or the parking brake device is changed from the applied state to the released state if an accelerator pedal of the utility vehicle 1 has been activated by the driver. This applies both to the phase in which the autonomous braking or deceleration which is initiated by the driver assistance system 2 still persists, and also to the phase in which the utility vehicle has already been braked to the stationary state after a collision has taken place. In both phases, the driver is therefore still to have the possibility of aborting, at his own volition, the autonomous braking which has been initiated and maintained by the ACC system.

In addition to the intervention into the brake device of the vehicle, the driver assistance system 2 can be designed in such a way that if predetermined driving data is present, such as an excessively small distance from a vehicle driving in front or an excessively high relative speed with respect to said vehicle, an engine control device 16 of a drive machine 18 of the utility vehicle 1 is made to reduce the driving power autonomously. In particular, the brake control device 10 is then also embodied in such a way that when driving data which indicates a directly imminent collision with an obstacle is detected, the function of the detection device 4 is monitored and if the detection device 4 no longer supplies any driving data or any plausible driving data to the brake control device 10, in addition to the continuation of the autonomous braking, a continuation of the autonomous reduction in the driving power of the drive machine 18 is also brought about, at least until the utility vehicle 1 has been decelerated to the predefined speed or to the stationary state. For this purpose, the brake control device 10 in which preferably the corresponding control routines for this functionality are implemented communicates, for example, with the engine control device 16 of the drive machine 18 via a data bus 20.

LIST OF REFERENCE NUMBERS

1 Utility vehicle
2 Driver assistance system
4 Detection device
6 Vehicle
8 Data line
10 Brake control device
12 Brake CAN
14 Brake actuator
16 Engine control device
18 Drive machine
20 Data bus The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driver assistance system for a vehicle, the driver assistance system comprising:
    a detection device which detects driving data characterizing a driving state of the vehicle; and
    a controller which processes the driving data detected by the detection device and, if predetermined driving data is present, causes a brake device to carry out autonomous braking of the vehicle,
    wherein when driving data which indicates a directly imminent collision with an obstacle is detected, the controller monitors a function of the detection device, and if the detection device no longer supplies any driving data or any plausible driving data to the controller, the controller brings about continuation of the autonomous braking at least until the vehicle has been decelerated to a predefined speed.

2. The driver assistance system as claimed in claim 1, wherein the predefined speed is equal to zero, at which speed the vehicle is in a stationary state.

3. The driver assistance system as claimed in claim 2, wherein after the autonomous braking of the vehicle to the stationary state, the controller keeps the brake device applied and/or applies a further brake device in order to keep the vehicle in a braked state.

4. The driver assistance system as claimed in claim 3, wherein the brake device is a service brake device and the further brake device is a parking brake device of the vehicle.

5. The driver assistance system as claimed in claim 4, wherein the parking brake device is activated electrically.

6. The driver assistance system as claimed in claim 1, wherein the controller changes the brake device from an applied state to a released state if an activation element has been activated.

7. The driver assistance system as claimed in claim 1, wherein the detection device detects a distance from another vehicle driving in front of the vehicle.

8. The driver assistance system as claimed in claim 7, wherein the detection device comprises at least one distance sensor or a deceleration sensor.

9. The driver assistance system as claimed in claim 1, wherein if the predetermined driving data is present, a drive machine is made to reduce a driving power autonomously, and if the detection device no longer supplies any driving data or any plausible driving data to the controller, the controller brings about a continuation of the autonomous reduction of the driving power of the drive machine, at least until the vehicle has been decelerated to the predefined speed.

10. A method for braking a vehicle, the method comprising:
    detecting, by a detection device, driving data characterizing a driving state of the vehicle;
    processing the detected driving data;
    if predetermined driving data is present, carrying out autonomous braking of the vehicle by a brake device;
    if driving data which indicates an immediately imminent collision with an obstacle is detected by the detection device, monitoring a function of the detection device; and
    if the detection device no longer supplies any driving data or any plausible driving data, continuing the autonomous braking at least until the vehicle has been decelerated to a predefined speed.

11. The method as claimed in claim 10, wherein a stationary state of the vehicle is used as the predefined speed.

12. The method as claimed in claim 11, wherein after the autonomous braking of the vehicle to the stationary state, the brake device remains applied and/or a further brake device is applied in order to keep the vehicle in a braked state.

13. The method as claimed in claim 10, wherein the brake device is changed from an applied state to a released state if an activation element has been activated.

14. The method as claimed in claim 10, wherein the detection device detects a distance from another vehicle driving in front of the vehicle.

15. The method as claimed in claim 10, wherein if the predetermined driving data is present, a drive machine is made to reduce the driving power autonomously, and if the detection device no longer supplies any driving data or any plausible driving data, continuation of the autonomous reduction in the driving power of the drive machine is brought about at least until the vehicle has been decelerated to the predefined speed.

* * * * *